United States Patent [19]

Yuda

[11] 4,023,758
[45] May 17, 1977

[54] PLASTIC DEVICE FOR SUPPORTING CORDS AND OTHER ELONGATED BODIES

[75] Inventor: Takuo Yuda, Yokohama, Japan

[73] Assignee: Nifco Inc., Tokyo, Japan

[22] Filed: Dec. 5, 1975

[21] Appl. No.: 637,913

[52] U.S. Cl. .............................. 248/73; 24/73 PB; 248/74 PB

[51] Int. Cl.² .............................................. F16L 3/08

[58] Field of Search .............. 248/73, 68 R, 74 PB, 248/74 A, 69; 174/72 A; 29/203 MW; 24/73 SA, 73 AP, 73 PB; 52/677

[56] References Cited

UNITED STATES PATENTS

| | | | |
|---|---|---|---|
| 2,082,099 | 6/1937 | Cruser | 174/72 A |
| 3,082,984 | 3/1963 | Larsson et al. | 248/68 R |
| 3,227,407 | 1/1966 | Soer | 248/54 R |
| 3,444,596 | 5/1969 | Soltysik | 24/73 SA |
| 3,473,769 | 10/1969 | James | 248/69 |
| 3,501,117 | 3/1970 | Soltysik | 248/71 |
| 3,515,363 | 6/1970 | Fisher | 248/74 PB X |
| 3,529,795 | 9/1970 | Van Niel | 248/74 PB X |
| 3,627,300 | 12/1971 | Caveney et al. | 248/68 R X |
| 3,659,319 | 5/1972 | Erickson | 248/74 A X |

FOREIGN PATENTS OR APPLICATIONS 1,577,684  8/1969  France ................. 24/73 AP

OTHER PUBLICATIONS

"Cable Enclosure," IBM Technical Disclosure Bulletin, Mitchell et al., vol. 12, No. 12, May 1970.
"Clips, Clamps, Harnesses, Straps, Ties, Guides, Supports," ITW Fastex Publication, received 5/28/71, Items 3 and 9, copyright 1970.

Primary Examiner—Roy D. Frazier
Assistant Examiner—Rodney H. Bonck
Attorney, Agent, or Firm—Jack R. Halvorsen; Robert W. Beart

[57] ABSTRACT

Disclosed is a plastic device for supporting cords and other elongated bodies which device essentially comprises an atoll-shaped main body having an opening, a pair of flexible door members protruding from the edges of the opening toward the interior of the main body and intersecting each other for thereby shutting the opening and an anchor piece to be inserted into an aperture of a plate. In use, the plastic device is fixed by pushing and inserting the anchor piece of the device into an aperture of a plate, and a bundle of wires are pushed against the intersecting door members so that the door members are yieldingly opened, thus allowing the bundle of the cords to enter the inner space of the atoll-shaped main body. Then, the door members are restored to the original intersecting position, thus preventing the cords from slipping out of the inner space of the main body.

1 Claim, 4 Drawing Figures

PLASTIC DEVICE FOR SUPPORTING CORDS AND OTHER ELONGATED BODIES

BACKGROUND OF THE INVENTION

This invention relates to a plastic device for use in supporting cords and electric wires extending in electric machines and apparatuses to prevent any displacement of the cords and electric wires therein.

As is well known, a variety of wire holders have been made of synthetic resin. This is because the material is easy to shape, and it has a proper stiffness and flexibility for the purpose. The conventional holders, therefore, have made full use of these advantageous features. The device for supporting cords and other elongated bodies according to this invention makes full use of such advantageous features of the material, too, and the object of this invention is to provide a holder device which is simple in operation, but still assures positive holding of a bundle of cords on plates or boards of electric machines and apparatuses.

SUMMARY OF THE INVENTION

To attain this object there is provided according to this invention a plastic device for supporting cords and other elongated bodies which comprises an atoll-shaped main body having an opening, a pair of flexible door members protruding from the edges of the opening toward the interior of the main body and intersecting each other for thereby shutting the opening and anchor piece to be inserted into an aperture of a plate on which a bundle of cords and other elongated bodies is laid. In use, the plastic device is fixed by inserting the anchor piece of the device into an aperture of a plate or board, and a bundle of wires is pushed against the intersecting door members so that the door members are yieldingly opened, thus allowing the bundle of the cords to enter the inner space of the atoll-shaped main body. Then, the door members are restored to the original intersecting (or closed) position, thus preventing the cords from slipping out of the inner space of the main body.

BRIEF EXPLANATION OF THE DRAWINGS

The objects and advantages of this invention will be better understood from the following description of a preferred embodiment which is to be made with reference to the accompanying drawings.

DETAILED DESCRIPTION OF THE INVENTION

Figure 1:
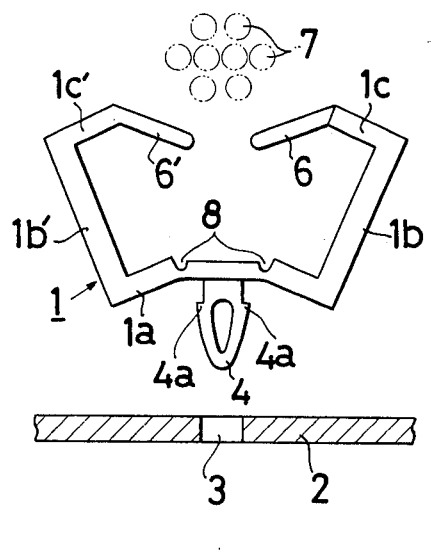
FIG. 1 shows a plastic device for supporting cords and other elongated bodies according to this invention.
Figure 2:
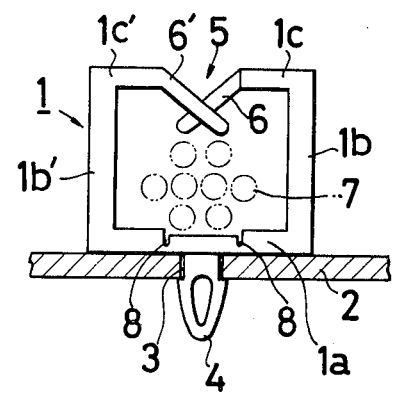
FIG. 2 shows the manner in which the device is used to support the cords or the like on a plate.
Figure 3:
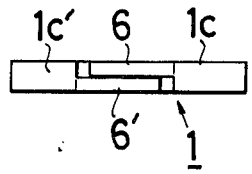
FIG. 3 is an end view of the device in the state of being fixed to the board.
Figure 4:
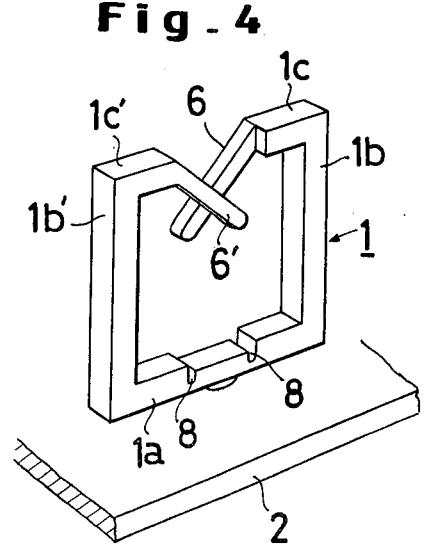
FIG. 4 is a perspective view of the device.

Referring to the drawings, particularly to FIG. 1, the holder device 1 is shown in the state in which it is not fixed to a board 2 of an electric machine or apparatus. FIGS. 2, 3 and 4 show the holder device in the state in which it is fixed to a board 2 of an electric machine or apparatus with its anchor fitted in an associated aperture 3 of the board. As seen from these drawings, the holder device 1 before being fixed to a board 2, will be in its open position, whereas the holder after being fixed to the board, will be in its closed position. This, however, is not the primary feature of the holder device according to this invention, as will be apparent later.

It should be noted that the holder device according to this invention should be in the form as shown in FIGS. 2, 3 and 4 after being fixed to a board of an electric machine or apparatus, regardless of the form it may be in before being fixed to the board. The open form of the holder device as shown in FIG. 1 results from convenience in shaping. This will be explained later. First, an embodiment of this invention is described with reference to FIGS. 2, 3 and 4. As shown in these drawings, an anchor means 4 is integrally connected to the undersurface of the lower and horizontal base 1a, and two vertical legs 1b and 1b' rise from the opposite ends of the horizontal base. Two opposite and upper arms 1c and 1c' are integrally connected to the ends of the vertical legs, extending toward each other in the opposite directions with their free ends spaced a predetermined distance. Thus, the horizontal base, two opposite side legs and two arms together form a rectangle. The ends of the two arms are spaced from each other so as to provide an opening 5 therebetween. As shown in the drawings, two door members 6 and 6' are integrally connected to the ends of the opposite arms, extending inwardly of the frame and intersecting with each other in such a way that the door members close the opening of the rectangle frame, with each member 6 and 6' having a length at least as great as the predetermined opening formed between the free extremities of the arms 1c and 1c', as seen in FIG. 2. This prevents inverting of the members 6 and 6' when they are subjected to undue stress by having the ends of members 6 and 6' capable of contacting the free end of the arms 1c' and 1c, respectively.

Each of the two arms 6 and 6' is half as thick as the associated arm 1c or 1c', thus making the door member easy to yield and deform if a force is applied to the door member. The suspending anchor 4 from the lower base 1a is used to fix the whole device to a board 2. The anchor 4 has a space therein, and therefor if a force is applied to the outer periphery of the anchor, it will be yieldingly deformed and reduced in size. The anchor has two opposite shoulders 4a on the outer periphery thereof. In this connection, when the anchor is inserted in an aperture of a board of an electric machine or apparatus, the anchor will collapse and pass through the aperture. After passing through the aperture of the board, the anchor will restore to the original and stress-free shape, and the shoulders of the anchor will catch the undersurface of the board to prevent the anchor from slipping out of the aperture.

In use, the anchor means 4 of the holder device is fitted in an associated aperture 3 of a board 2 of an electric machine or apparatus, thus positively fixing the whole device to the board. A bundle of cords or other elongated bodies are pushed against the door members 6 and 6' of the device, and then the door members 6 and 6' are yieldingly deformed and opened, thus allowing a bundle of cords to enter the inner space of the rectangle frame. After the cords pass through the opening of the frame, the door members will restore to their original form because of their nature of elasticity, thus closing the opening of the rectangle frame and preventing the cords from slipping out of the inner space of the frame. As is readily understood from the structure of the holder device, if a stronger force is required to remove a bundle of cords from the inner space of the holder device than is required to push the bundle of cords into the frame. This is because the cords must be pulled out against the intersecting and closed door members.

As is apparent from the above, a plastic device for supporting cords and other elongated bodies according to this invention is very easy in operation, requiring a single push in fixing the device to a board and another single push in inserting a bundle of cords in the frame of the device. The size of the holder is properly determined from the total diameter of a bundle of cords to be supported.

As mentioned earlier, a holder device according to this invention is moulded in the form as shown in FIG. 1, and in use it is in the form as shown in FIGS. 2, 3 and 4. This is simply because of convenience in shaping. Specifically, the particular shape of the device as shown in FIG. 1 permits the use of two split moulds in shaping, and accordingly it is effective in reducing the cost in production. The shape of the holder device as shown in FIGS. 2, 3 and 4 (i.e. the shape having two intersecting door members at the opening of the device) cannot be produced in an integral form by a two-split mould. In this connection, in the embodiment as shown, the horizontal base 1a is composed of three separate parts, and these parts are hinge-connected to each other as indicated at 8. Thus, the horizontal base in its normal or stress-free position will be in a bent form.

In this connection the vertical side legs 1b and 1b' rising from the opposite ends of the horizontal base will diverge, and the upper arms 1c and 1c' and hence associated door members 6 and 6' will be accordingly part from each other. This open shape is advantageous to shaping by a two-split mould. In use, the anchor 4 of the device is inserted in an associated aperture 3 of a board of an electric machine or apparatus. As a result the lower base of the device is stretched out in the horizontal position on the board and the opposite legs 1b and 1b' are raised in the vertical position, and the opposite door members are brought to the natural and intersecting position to close the opening of the rectangle frame.

In this particular embodiment, the sides of the frame of the device constitute a rectangle form. This should not be understood to be limitative, and the lower base, vertical side legs and opposite upper arms may be modified to constitute an open ring, and the pair of door members may be integrally connected to the opposite end of the loop hole.

What is claimed is:

1. A one-piece plastic device for supporting cords and other elongated bodies relative to an apertured plate including a body having a lower base contacting said plate, two side legs extending upwardly away from opposite ends of the lower base, two cross arms extending substantially parallel to said lower base in cantilever fashion from the free ends of the legs toward each other to define an opening therebetween, a pair of flexible members extending angularly inwardly toward said base from the free ends of the cross arms and overlapping each other in side by side relation to close the opening defined by the ends of the cross arms, said resilient members being angularly disposed downwardly toward said base to define a V-shaped throat for lead-in of said cords and elongated bodies into said opening, and anchoring means acceptable within an aperture of said plate extending from said base in a direction opposite from said legs, said body, legs and arms each lying on a common plane and each having a predetermined thickness relative to said plane and each of said flexible members having a thickness less than the thickness of said arms and each having a length at least equal to the size of said opening as defined by the distance between the free ends of said cross arms and said base including two flexible resilient hinge elements joining three parts of said base, the central part carrying said anchor means and the other two outer parts carrying said side legs.

* * * * *